United States Patent
Hunt et al.

(10) Patent No.: US 12,298,501 B2
(45) Date of Patent: May 13, 2025

(54) OPTICAL SEE-THROUGH VIEWING DEVICE AND METHOD FOR CALIBRATING PROVISION OF VIRTUAL CONTENT OVERLAPPING VISUAL OBJECTS

(71) Applicant: Telefonaktiebolaget LM Ericsson (publ), Stockholm (SE)

(72) Inventors: Alexander Hunt, Tygelsjö (SE); Saeed Bastani, Dalby (SE); Andreas Kristensson, Södra Sandby (SE); Yun Li, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 795 days.

(21) Appl. No.: 17/616,255

(22) PCT Filed: Jun. 7, 2019

(86) PCT No.: PCT/EP2019/064981
§ 371 (c)(1),
(2) Date: Dec. 3, 2021

(87) PCT Pub. No.: WO2020/244780
PCT Pub. Date: Dec. 10, 2020

(65) Prior Publication Data
US 2022/0244541 A1    Aug. 4, 2022

(51) Int. Cl.
*G02B 27/00* (2006.01)
*G02B 27/01* (2006.01)

(52) U.S. Cl.
CPC ..... *G02B 27/0093* (2013.01); *G02B 27/0149* (2013.01); *G02B 27/0172* (2013.01);
(Continued)

(58) Field of Classification Search
CPC ...... G02B 2027/0138; G02B 2027/014; G02B 2027/0159; G02B 27/0093; G02B 27/0149; G02B 27/017; G02B 27/0172
See application file for complete search history.

(56) References Cited

U.S. PATENT DOCUMENTS 5,825,340 A    10/1998 Torizuka et al.
10,070,120 B2 *  9/2018 Pedley ............... G02B 27/0189
(Continued)

FOREIGN PATENT DOCUMENTS

CN    106125930 A    11/2016
CN    107623803 A    1/2018
(Continued)

OTHER PUBLICATIONS

Bimber, Oliver, et al., "Modern Approaches to Augmented Reality", Spatial Augmented Reality, Siggraph 2005, 2005, 1-86.
(Continued)

*Primary Examiner* — Dmitriy Bolotin
(74) *Attorney, Agent, or Firm* — Murphy, Bilak & Homiller, PLLC

(57) ABSTRACT

An Optical See-Through viewing device (100) comprising a controller (101) configured to control a display arrangement (110) comprising an image capturing device (112) and a reflective device (114), wherein the controller (101) is further configured to calibrate the Optical See-Through viewing device (100) by: a) adapting (600) the reflective device (114) to enable the image capturing device to capture an image of a user's eye (E); b) capturing (610) an image of a user's eye (E); c) determining (620) a location of the user's eye (E); d) determining (630) a displacement for adapting the display arrangement (110); e) adapting (640) at least a part of the display arrangement (110, 112, 111); and f) returning (650) the reflective device (114).

20 Claims, 5 Drawing Sheets

(52) U.S. Cl.
CPC .............. *G02B 2027/0138* (2013.01); *G02B 2027/014* (2013.01); *G02B 2027/0159* (2013.01)

(56) References Cited

U.S. PATENT DOCUMENTS

| | | | |
|---|---|---|---|
| 10,510,137 B1* | 12/2019 | Kitain | .................. F41G 3/2611 |
| 10,608,409 B1* | 3/2020 | Gibson | .............. G02B 27/0172 |
| 10,698,481 B1* | 6/2020 | Najafi Shoushtari | .. G06V 20/20 |
| 2002/0105484 A1* | 8/2002 | Navab | .................. H04N 13/327 |
| | | | 348/E13.052 |
| 2012/0007839 A1 | 1/2012 | Tsao et al. | |
| 2013/0235191 A1 | 9/2013 | Miao et al. | |
| 2014/0104692 A1* | 4/2014 | Bickerstaff | ........ G02B 27/0172 |
| | | | 359/630 |
| 2014/0267667 A1 | 9/2014 | Ellsworth | |
| 2014/0300632 A1 | 10/2014 | Laor | |
| 2015/0049201 A1* | 2/2015 | Liu | .................... H04L 12/1827 |
| | | | 348/189 |
| 2015/0279113 A1 | 10/2015 | Knorr et al. | |
| 2016/0124230 A1 | 5/2016 | Hino et al. | |
| 2016/0191887 A1 | 6/2016 | Casas | |
| 2016/0225191 A1 | 8/2016 | Mullins | |
| 2016/0240125 A1 | 8/2016 | Sridharan et al. | |
| 2016/0267720 A1 | 9/2016 | Mandella et al. | |
| 2017/0035293 A1 | 2/2017 | Nistico et al. | |
| 2017/0039774 A1 | 2/2017 | Estable | |
| 2017/0255013 A1* | 9/2017 | Tam | .................... G03H 1/2294 |
| 2018/0018791 A1 | 1/2018 | Guoyi | |
| 2018/0019791 A1 | 1/2018 | Molev Shteiman et al. | |
| 2018/0084232 A1 | 3/2018 | Belenkii et al. | |
| 2019/0019308 A1 | 1/2019 | Iwata | |
| 2019/0025588 A1 | 1/2019 | Osterhout et al. | |
| 2019/0025589 A1 | 1/2019 | Haddick | |
| 2019/0025590 A1 | 1/2019 | Haddick | |
| 2019/0041642 A1 | 2/2019 | Haddick et al. | |
| 2019/0246889 A1* | 8/2019 | Marin | ...................... A61B 3/08 |
| 2020/0201050 A1 | 6/2020 | Osterhout et al. | |
| 2021/0278675 A1* | 9/2021 | Klug | ...................... A61B 5/163 |
| 2021/0347318 A1 | 11/2021 | Knutsen et al. | |
| 2022/0091423 A1 | 3/2022 | Haddick | |
| 2022/0326528 A1 | 10/2022 | Haddick | |
| 2023/0237703 A1* | 7/2023 | Ma | ........................... G06T 7/70 |

FOREIGN PATENT DOCUMENTS

| | | |
|---|---|---|
| EP | 2966863 A1 | 1/2016 |
| KR | 20150020801 A | 2/2015 |
| WO | 2012118573 A1 | 9/2012 |
| WO | 2015048911 A1 | 4/2015 |
| WO | 2018116253 A1 | 6/2018 |

OTHER PUBLICATIONS

Toh, Yuta, et al., "Interaction-Free Calibration for Optical See-Through Head-Mounted Displays based on 3D Eye Localization", IEEE Symposium on 3D User Interfaces, Minneapolis, Minnesota, Mar. 29-30, 2014, 1-8.

Langlotz, Tobias, et al., "Real-Time Radiometric Compensation for Optical See-Through Head-Mounted Displays", IEEE Transactions on Visualization and Computer Graphics, vol. 22, No. 11, Nov. 2016, 1-10.

Owen, Charles B., et al., "Display-Relative Calibration for Optical See-Through Head-Mounted Displays", Proceedings of the Third IEEE and ACM International Symposium on Mixed and Augmented Reality (ISMAR 2004), IEEE Computer Society, 2004, 1-9.

* cited by examiner

OPTICAL SEE-THROUGH VIEWING DEVICE AND METHOD FOR CALIBRATING PROVISION OF VIRTUAL CONTENT OVERLAPPING VISUAL OBJECTS

TECHNICAL FIELD

The present invention relates to an optical see-through viewing device and a method, and in particular to an optical see-through viewing device and a method for calibrating a provision of virtual content overlapping visual objects that is easy to perceive.

BACKGROUND

Virtual Reality (VR) systems are growing in popularity. Similarly so-called mixed or augmented reality systems are also growing in popularity. In contrast to virtual reality systems, where everything is virtual, augmented reality systems are based on a real world view onto which virtual content is displayed. A user is thus presented with a real world view of real life objects and the view is augmented with virtual objects or contents providing functionality and/or information. A very popular example is the game Pokemon Go™ where a user looks at his smartphone screen on which a video capture of the current camera view is shown. On to this camera view certain symbols and "monsters" are displayed as virtual objects enabling the user to see information and "monsters" that is hidden to the naked eye and to go hunt for the "monsters". Pokemon Go™ is an example of Video See-Through, where a camera captures what is behind a smartphone and this is displayed on the smartphone's display overlaid with virtual content.

However, in optical see-through (OST) systems the user is not presented with a camera capture, but the user actually sees through a device and looks at the real life world directly. The user will thus be presented with two views overlapping each other, one where virtual content is provided and one where the real-life objects are provided. In contrast, in a virtual system the user would be presented with one view where both the real-life objects and the virtual content is displayed.

The inventors have realized a problem that exist in optical see-through systems when equipped with augmented reality, namely that all the displayed virtual content may not be properly aligned with the underlying real-life objects that are viewed through the OST device as there may be alignment or parallax errors. The inventors have realized that as different users are shaped differently, there will also be a difference in the placement of the users' eyes and different users will therefore view the combined view of virtual content and the underlying real-life objects differently.

FIGS. 1A and 1B illustrate the problem, where in FIG. 1A a user, represented by an eye E, is viewing a combined view (shown on the right) of a virtual content view, in which virtual content 115 is displayed by a display arrangement 110 DA, that overlaps a view of real-life objects RLO. As can be seen in FIG. 1A, the user's eye E is aligned with the virtual content 115 and the virtual content 115 is displayed and viewed as overlapping the real-life objects as intended. FIG. 1B shows the situation where the user's eye E is placed at a higher location and is not aligned with the virtual content 115. The virtual content 115 will then not be displayed along the line of sight is displayed and the user will view the virtual content as only partially overlapping the real-life objects and not completely overlapping as intended.

The inventors have further realized that a calibration based on manual correction is not efficient and may be too advanced for the everyday user and is thus error prone. A continuous calibration, such as performed via for example eye-tracking requires specific hardware for performing the eye tracking and also requires computational resources and power.

As the inventors have realized, there is thus a need for a device and a method for providing a quick manner of calibrating an OST device that is not prone to errors and does not require vast computational resources or dedicated hardware.

An augmented reality system will, herein, be defined as a system where virtual content is displayed as overlapping (physical) real-life visual objects. There will thus not be made any difference between augmented reality, mixed reality or enhanced reality for the context of this application and the problems and their solutions discussed herein applies to all Optical See-Through (OST) devices.

SUMMARY

An object of the present teachings is to overcome or at least reduce or mitigate the problems discussed in the background section.

According to one aspect an Optical See-Through viewing device comprising a controller configured to control a display arrangement comprising an image capturing device and a reflective device, wherein the controller is further configured to calibrate the Optical See-Through viewing device by:

a) adapting the reflective device to enable the image capturing device to capture an image of a user's eye;
b) capturing an image of a user's eye;
c) determining a location of the user's eye;
d) determining a displacement for adapting the display arrangement;
e) adapting at least a part of the display arrangement; and
f) returning the reflective device.

This has the benefit that by moving or otherwise adapting the reflective device, an image of the eye may be obtained from which an exact position of the specific current user's eye is obtainable and an exact calibration can thus be achieved in a very short time, and only using a minimum of resources In one embodiment the controller is further configured to rotate the reflective device around a rotation axis that is in line with a center line of the reflective device.

In one embodiment the controller is further configured to rotate the reflective device 90 degrees. In one embodiment the controller is further configured to a) adapt the reflective device when the Optical See-Through viewing device is de-activated. This enables for a very fast calibration when the device is re-activated.

In one embodiment the controller is further configured to e) adapting the display arrangement by moving a part of it.

In one embodiment the controller is further configured to e) adapting the display arrangement by moving the image capturing device.

In one embodiment the controller is further configured to determinate that there is an eye present before capturing an image of the user's eye.

In one embodiment the controller is further configured to initiate the calibration when the Optical See-Through viewing device is activated.

In one embodiment the controller is further configured to a) adapt and f) return the reflective device by rotating it. This provides for a very fast and effective adaptation that is cost-effective.

In one embodiment the controller is further configured to determine that the Optical See-Through viewing device is being worn and in response thereto initiate the calibration.

In one embodiment the controller is further configured to determine that the Optical See-Through viewing device is no longer being worn and in response thereto a) adapt the reflective device.

In one embodiment the Optical See-through device further comprises an activity sensor, wherein the controller is further configured to determine whether the Optical See-Through viewing device is being worn based on sensor input received from the activity sensor.

In one embodiment the activity sensor is a pressure sensor.

In one embodiment the Optical See-through device further comprises at least one nose pad, wherein the pressure sensor is arranged in the at least one nose pad.

In one embodiment the activity sensor is a capacitive sensor.

In one embodiment the activity sensor is a motion sensor.

In one embodiment the activity sensor is a light sensor.

In one embodiment the controller is further configured to adapt the at least a part of the display arrangement by moving the at least a part of the display arrangement in at least one of two directions.

In one embodiment the controller is further configured to adapt the at least a part of the display arrangement by moving the at least a part of the display arrangement in at least one of three directions.

In one embodiment the controller is further configured to adapt the at least a part of the display arrangement by moving the at least a part of the display arrangement in an angular direction.

In one embodiment the display arrangement further comprises a display device and the image capturing device is arranged on an opposite side of the reflective device to the display device.

According to one aspect a method for use in an OST viewing device is provided, the method being for calibrating the Optical See-Through viewing device comprising a display arrangement comprising an image capturing device and a reflective device, wherein the method comprises:
  a) adapting the reflective device to enable the image capturing device to capture an image of a user's eye;
  b) capturing an image of a user's eye;
  c) determining a location of the user's eye;
  d) determining a displacement for adapting the display arrangement;
  e) adapting at least a part of the display arrangement; and
  f) returning the reflective device.

According to one aspect there is provided a computer-readable medium carrying computer instructions that when loaded into and executed by a controller of a viewing device enables the viewing device to implement a method according to herein.

According to one aspect there is provided a software component arrangement for calibrating an Optical See-Through viewing device comprising a controller configured to control a display arrangement comprising an image capturing device and a reflective device, wherein the software component arrangement comprises:

a) a software component for adapting the reflective device to enable the image capturing device to capture an image of a user's eye;
  b) a software component for capturing an image of a user's eye;
  c) a software component for determining a location of the user's eye;
  d) a software component for determining a displacement for adapting the display arrangement;
  e) a software component for adapting at least a part of the display arrangement; and
  f) a software component for returning the reflective device.

Further embodiments and advantages of the present invention will be given in the detailed description.

BRIEF DESCRIPTION OF THE DRAWINGS

Embodiments of the invention will be described in the following, reference being made to the appended drawings which illustrate non-limiting examples of how the inventive concept can be reduced into practice.

DETAILED DESCRIPTION

Figure 2:
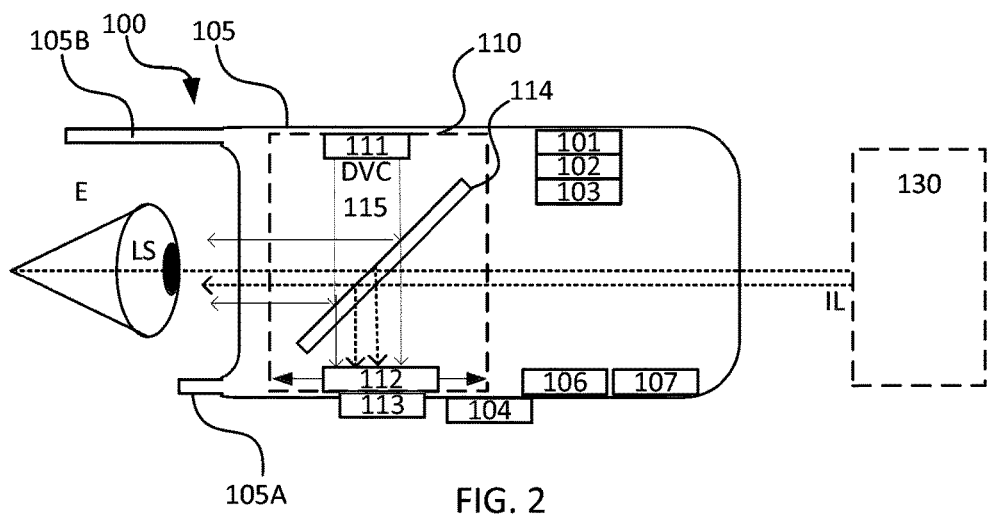
FIG. 2 shows a schematic view of an optical see-through viewing device according to an embodiment of the present invention.

FIG. 2 shows a schematic view of an optical see-through (OST) viewing device 100 according to an embodiment of the present invention. The viewing device 100 is a see-through device, where a user looks in through one end, and sees the real-life objects (RLO) in the line of sight (indicated LS in FIG. 2) at the other end of the viewing device 100.

In one embodiment the viewing device 100 is a head-mounted viewing device (HMD) 100 to be worn by a user (not shown explicitly but represented by the eye E in FIG. 2) for looking through the viewing device 100. In one such embodiment the viewing device 100 is arranged as glasses, or other eye wear including goggles, to be worn by a user.

The viewing device 100 is in one embodiment arranged to be hand-held, whereby a user can hold up the viewing device 100 to look through it.

The viewing device 100 is in one embodiment arranged to be mounted on for example a tripod, whereby a user can mount the viewing device 100 in a convenient arrangement for looking through it. In one such embodiment, the viewing device 100 may be mounted on a dashboard of a car or other vehicle.

The viewing device 100 comprises a housing 105 and transparent display arrangement 110. The display arrangement 110, is self-illuminating, and is therefore configured to be capable of displaying content for example using a display device 111 such as a projector, a Liquid Cristal Display (LCD) or an Organic Light-Emitting Diode (OLED) display. The following examples will be given assuming a projector is used, but it should be noted that this is only one possible alternative. The display arrangement 110 is arranged in the housing 105 so that a visual object VO may be perceived along the line of sight, indicated LS in the figure, or field of view of an eye E looking through the viewing device 100.

The display arrangement 110 is configured to display virtual content DVC to be viewed by the user. As the display arrangement 110 is transparent, the displayed virtual content DVC will be perceived by a user as overlapping any visual real life objects RLOs viewed through the viewing device 100. The viewing device 100 is thus suitable for use with augmented reality, mixed reality and extended reality systems. For the purpose of this application, augmented reality AR will be considered to be the equivalent and interchangeable with the terminologies of mixed reality and extended reality. Further references will simply be to Augmented Reality (AR), but applies equally to mixed or extended reality.

Figure 1A:
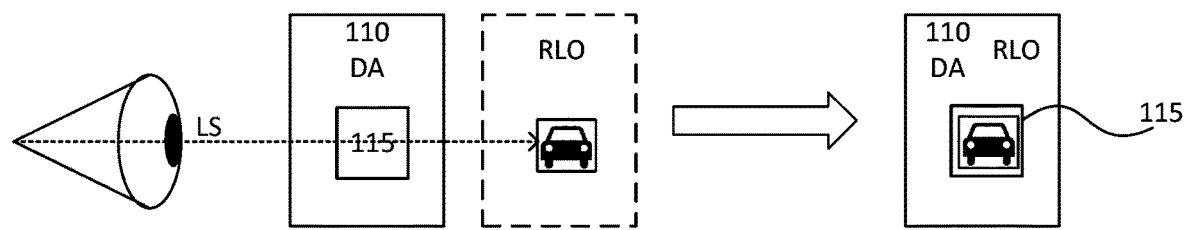
FIGS. 1A and 1B each shows a schematic view of the problem as it appears in prior art systems.
Figure 1B:
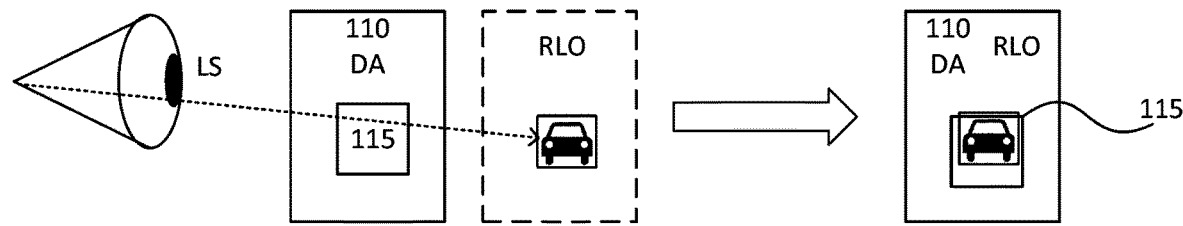
Figure 3:
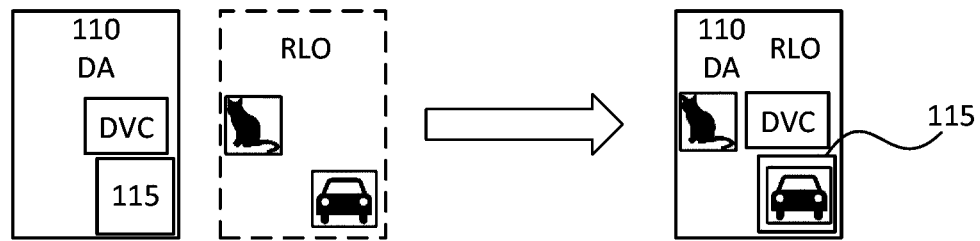
FIG. 3 shows a schematic view of the operation of a viewing device according to one embodiment of the teachings herein.

An example view of how the virtual content is displayed to overlap the real life objects RLOs 130 is shown in FIG. 3, which shows a schematic view of an exemplary view seen through the viewing device 100. FIG. 3 corresponds to the prior art situation of FIGS. 1A and 1B but shown herein as focusing on how a user perceives the augmented reality using an OST device as per the teachings of this application. On the left of the figure, there is shown the display arrangement 110 and the displayed virtual content DVC being displayed on the display arrangement 110 and also the current field of view 130 (dashed rectangle) with the visual real life objects RLOs currently viewable. In this example view, the real life objects RLOs are exemplified as a box showing a cat and a box showing a car. On the right of the figure, the composite or combination of the two views is shown, i.e. the view actually seen by the user through the viewing device 100. As can be seen, the displayed virtual content DVC, also referenced 115 in the figures, is perceived as overlapping the real life objects RLOs thereby providing an augmented reality. As can also be seen, especially when compared to FIG. 1B, if the DVC overlaps the RLOs and the eye is not properly aligned, the combined view may become distorted or compromised, or at least be perceived as distorted or compromised by the user, making it more difficult to perceive the augmented reality and the DVC or the RLOs.

The viewing device 100 also comprises an image capturing device 112, such as a camera or image sensor. The image capturing device 112 is arranged where it can capture an image (still or video stream) of the view seen by the user. The exact placement of the image capturing device 112 depends on the current display arrangement and design options, but is illustrated in FIG. 2 to be substantially opposite the display device 111. In one embodiment the image capturing device 112 is arranged next to or adjacent to the display device 111. In one embodiment the image capturing device 112 is arranged next to or adjacent to the user's Eye. For the purpose of this application, 'adjacent' (to an entity) is seen as 'to be next to' (the entity) and/or 'within a short distance' (to the entity).

The viewing device 100 further comprises a controller 101 and a memory 102. The controller 101 is configured to control the display arrangement to display the virtual content.

The controller 101 is also configured to control the overall operation of the viewing device 100, including the display arrangement 110. In one embodiment, the controller 101 is a graphics controller. In one embodiment, the controller 101 is a general purpose controller. In one embodiment, the controller 101 is a combination of a graphics controller and a general purpose controller. As a skilled person would understand there are many alternatives for how to implement a controller, such as using Field-Programmable Gate Arrays circuits in addition or as an alternative. For the purpose of this application, all such possibilities and alternatives will be referred to simply as the controller 101.

In one embodiment, the controller 101 is configured to receive the virtual content to be displayed. In one embodiment, the controller 101 is configured to generate the virtual content to be displayed. In one embodiment, the controller 101 is configured to receive parts of the virtual content to be displayed and to generate parts of the virtual content to be displayed.

The memory 102 is configured to store graphics data and computer-readable instructions that when loaded into the controller 101 indicates how the viewing device 100 is to be controlled. The memory 102 may comprise several memory units or devices, but they will be perceived as being part of the same overall memory 102. There may be one memory unit for the display arrangement storing graphics data, one memory unit for the image capturing device storing settings, one memory for the communications interface (see below) for storing settings, and so on. As a skilled person would understand there are many possibilities of how to select where data should be stored and a general memory 102 for the viewing device 100 is therefore seen to comprise any and all such memory units for the purpose of this application. As a skilled person would understand there are many alternatives of how to implement a memory, for example using non-volatile memory circuits, such as EEPROM memory circuits, or using volatile memory circuits, such as RAM memory circuits. For the purpose of this application all such alternatives will be referred to simply as the memory 102.

In one embodiment the viewing device 100 further comprises a communication interface 103. The communication interface may be wired and/or wireless. The communication interface may comprise several interfaces.

In one embodiment the communication interface comprises a USB (Universal Serial Bus) interface. In one embodiment the communication interface comprises a HDMI (High Definition Multimedia Interface) interface. In one embodiment the communication interface comprises a Display Port interface. In one embodiment the communication interface comprises an Ethernet interface. In one embodiment the communication interface comprises a MIPI (Mobile Industry Processor Interface) interface.

In one embodiment the communication interface comprises a radio frequency (RF) communications interface. In one such embodiment the communication interface comprises a Bluetooth™ interface, a WiFi™ interface, a ZigBee™ interface, a RFID™ (Radio frequency IDeintifier) interface, Wireless Display (WiDi) interface, Miracast interface, and/or other RF interface commonly used for short range RF communication. In an alternative or supplemental such embodiment the communication interface comprises a cellular communications interface such as a fifth generation (5G) cellular communication interface, an LTE (Long Term Evolution) interface, a GSM (Global Systéme Mobilé) interface and/or other interface commonly used for cellular communication. In one embodiment the communications interface is configured to communicate using the UPnP (Universal Plug n Play) protocol. In one embodiment the communications interface is configured to communicate using the DLNA (Digital Living Network Appliance) protocol.

In one embodiment, the communications interface 103 is configured to enable communication through more than one of the example technologies given above. As an example, a wired interface, such as MIPI could be used for establishing an interface between the display arrangement, the controller and the user interface, and a wireless interface, for example WiFi™ could be used to enable communication between the viewing device 100 and an external host device (not shown).

The communications interface 103 is configured to enable the viewing device 100 to receive and/or transmit data and/or instructions regarding the virtual content to be displayed. The communications interface 103 may also be configured to enable the viewing device 100 to communicate with other devices, such as other viewing devices 100 and/or smartphones, internet tablets, computer tablets or other computers, media devices, such as television sets, gaming consoles, video viewer or projectors (not shown).

In one embodiment the display arrangement 110 of the viewing device 100 comprises a display device 111 (such as a projector device) and a partially transparent reflective device 114, such as a mirror 114. Examples of display devices 111 are, but not restricted to, a DLP (Digital Light Processing) projector, an LCD (Liquid Cristal Display), an LED (Light Emitting Diode) or OLED (Organic Light Emitting Diode) display. The display device 111 is arranged to project the content to be displayed DVC also referenced 115 onto the partially transparent reflective device 114. The partially transparent reflective device 114 is arranged to reflect the displayed virtual content DVC to a user and to enable real life objects RLOs to be perceivable through the partially transparent reflective device. The user will thereby perceive the displayed virtual content DVC as overlapping the RLOs. In one embodiment, the reflective device 114 is arranged at an angle of 45 degrees relative the line of sight of the user, and/or, alternatively or additionally, relative the display device 111.

The image capturing device 112 of the display arrangement 110 is arranged opposite the display device 111, i.e. on the other side of the reflective device 114. As noted above, the image capturing device 112 may also be arranged adjacent the user's eye or adjacent the display device 111, i.e. on the same side of the reflective device 114 as the projector. Arranging the image capturing device 112 adjacent the display device 111 or adjacent the eye provides for a simpler or smaller housing 105, as no underside of the housing is technically needed or at least can be made smaller. Arranging the image capturing device 112 on the opposite side of the reflective device 114 provides for a higher degree of freedom of movement for the image capturing device 112, thereby providing a more efficient calibration.

The image capturing device 112 is, in any embodiment, arranged to substantially lie in the line of sight of the user, at least in a reflected line of sight. The image capturing device 112 will thus be able to capture what the user's sees. For the embodiment where the image capturing device 112 is arranged opposite the display device 111 (as is illustrated in FIG. 2), the image capturing device 112 is arranged on the underside of the reflective device 114. As can be seen, the line of sight LS (or rather its reflection in the transparent reflective device 114) corresponds to or falls in the center of the image capturing device 112. The image capturing device 112 is thus aligned with the eye E. The image capturing device 112 will thus capture the same view as is seen by the user. This is indicated by all arrows indicting the view of the DVC, the background 130 (the illuminating light IL) being captured by the image capturing device 130 in a similar manner as they are captured or received by the eye E.

It should be noted that even though the description herein is only focusing on one reflective device 114, assumingly comprising one mirror, the actual number of mirrors comprised in the reflective device 114 may depend on the location of the image capturing device 112. The reflective device 114 may thus be configured with one or two mirrors or reflective surfaces 114A, 114B.

Figure 4A:
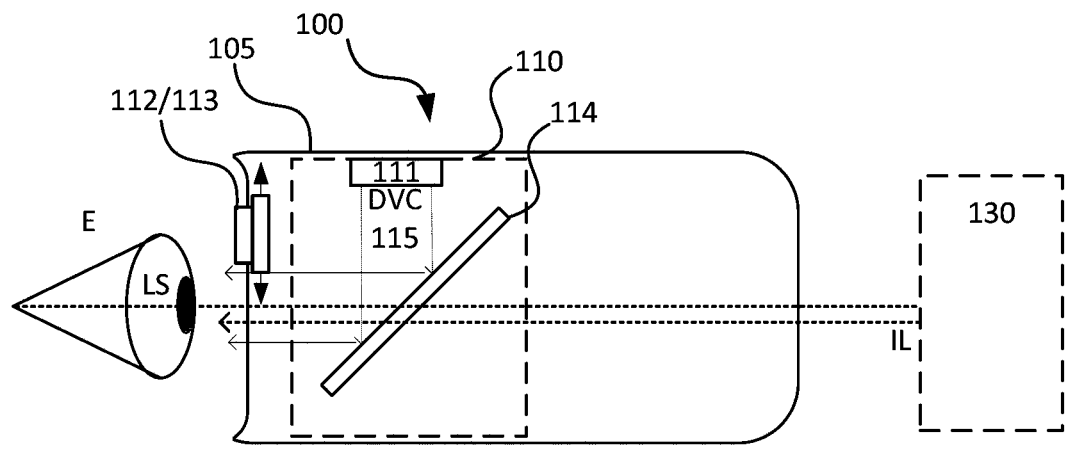
FIGS. 4A and 4B are each a schematic view of an optical see-through viewing device according to an embodiment of the present invention.
Figure 4B:
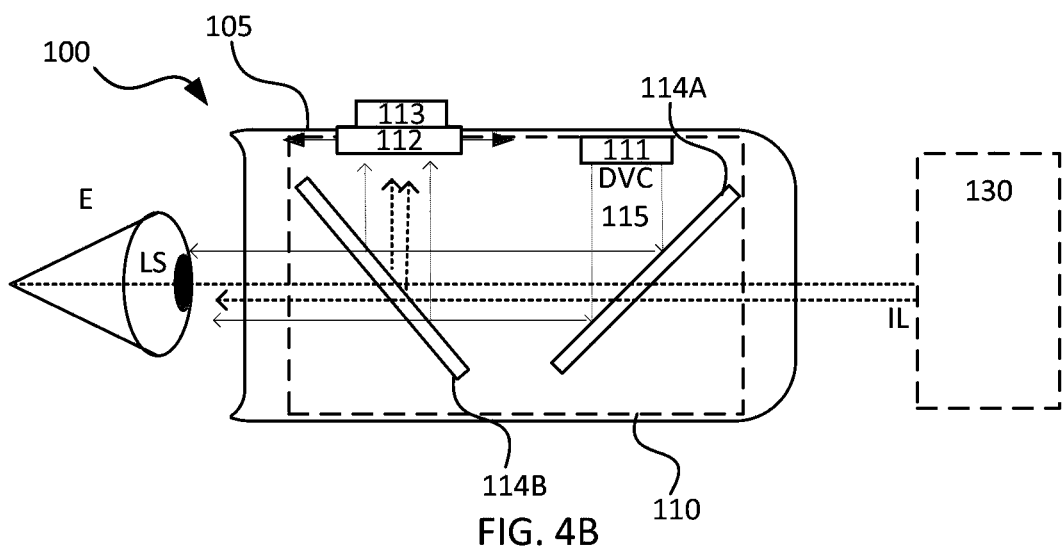

FIG. 4A shows an embodiment where the image capturing device 112 is arranged adjacent to the user's eye. FIG. 4B shows an embodiment where the image capturing device 112 is arranged adjacent to the display device 111. As can be seen in FIG. 4B, the reflective device 114 comprises two reflective surfaces 114A and 114B. In the example embodiment shown in FIG. 4B, the reflective surfaces are angled differently in order to allow the light emitted by the real-life objects and/or the displayed virtual content to be properly reflected.

It should be noted that even though the description herein is only focusing on one image capturing device 112, the actual number of image capturing devices 112 may depend on how many eyes the viewing device is arranged for. The viewing device 100 may thus be configured with one or two image capturing devices 112. For a multi-eye viewing device 100, there may be more than one image capturing devices 112, one for each eye E. Alternatively and/or additionally there may also be one display arrangement 110 for each eye.

As is indicated in FIGS. 2, 4A and 4B by the dashed arrows emanating from the image capturing device 112, the image capturing device 112 is in one embodiment arranged to be movable. The image capturing device may be movable in two dimensions (X-, Y-directions), or in three dimensions (X-, Y-, Z-directions). The image capturing device 112 may also be arranged to be movable in one (or two) angular directions, i.e. the image capturing device 112 may be tilted. In one embodiment the image capturing device 112 comprises an image capturing device moving arrangement 113 of one or more electric motors and a mechanical assembly for moving the image capturing device 112. The mechanical assembly may comprise gears and levers. The image capturing device moving arrangement 113 may additionally or alternatively comprise an electromagnetic assembly for moving the image capturing device 112 by altering an electromagnetic field. The viewing device 100 may also comprise a user interface 104 for receiving input from a user. The user interface 104 may comprise actuators enabling a user to indicate how the image capturing device 112 should be moved, thereby enabling a user to move the image capturing device 112. The user interface may be connected (at least a part of it) directly to the image capturing device moving arrangement 113.

The image capturing device 112 may also or alternatively be arranged to be virtually movable, wherein the controller is configured to align the image captured by the image capturing device along different center lines. In one such an embodiment, the image capturing device 112 is arranged to capture a larger field of view than is perceivable by the eye.

In such an embodiment, the user interface 104 may also be used to indicate how the image capturing device 112 should be moved virtually.

The user interface 104 may be comprised in the viewing device as physical means. Additionally or alternatively, (at least a part of) the user interface 104 may be comprised remotely in the viewing device 100 through the communication interface 103, the user interface then (at least a part of it) not being a physical means in the viewing device 100, but implemented by receiving user input through a remote device (not shown) through the communication interface 103. One example of such a remote device is a game controller, a mobile phone handset, a tablet computer or a computer.

Returning to FIG. 2, the viewing device 100 may also comprise a sensor 106 for detecting whether it is being worn or not by a user. The sensor is in other words arrange to sense if the viewing device 100 is in an active position or not, the sensor being an activity sensor. In one embodiment, where the viewing device is a head-mounted device (HMD), the activity sensor 106 may be arranged in nose pads (seen as part of the housing and indicated 105A). In one alternative or additional embodiment, where the viewing device is a head-mounted device (HMD), the activity sensor 106 may be arranged in one or more temples, a top bar or a headband (seen as part of the housing and indicated 105B).

In one embodiment the activity sensor 106 is a pressure sensor arranged to sense that the viewing device is being worn by a user, by the part of the housing where the activity sensor 106 is arranged is pressed against assumingly the user.

In one embodiment the activity sensor 106 is a proximity sensor arranged to sense that the viewing device is being worn by a user.

In one such embodiment the activity sensor 106 is a capacitive sensor arranged to sense that the viewing device is being worn by a user, by the part of the housing where the activity sensor 106 is arranged is in contact with assumingly the user.

In one such embodiment the activity sensor 106 is a light sensor, such as an ambient light sensor, arranged to sense that the viewing device is being worn by a user, by the part of the housing where the activity sensor 106 is arranged is blocked from incoming light assumingly by the user.

In one embodiment the activity sensor 106 is a motion sensor, such as an accelerometer, arranged to sense that the viewing device is being (picked up and) worn by a user, by the motion sensor providing motion sensing data that is matched to a motion profile for wearing the viewing device 100.

FIGS. 5A, 5B, 5C, 5D, 5E and 5F shows how the viewing device 100 may be calibrated in a simple, yet inventive manner as realized by the inventors according to the teachings herein.

Figure 5A:
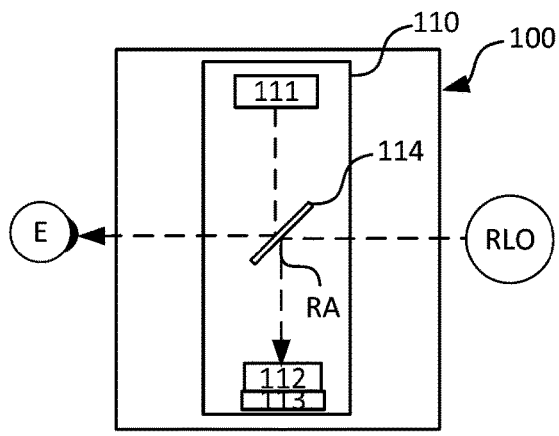
FIGS. 5A, 5B, 5C, 5D, 5E and 5F each shows a schematic view of an aspect of the calibration of a viewing device according to an embodiment of the present invention.

In FIG. 5A a simplified view of a viewing device 100 is shown. Even if all components are not shown in FIG. 5A it should be understood that the viewing device of FIG. 5A is a viewing device 100 as in FIG. 2 and that the teachings are applicable also to a viewing device 100 as in FIG. 4A or 4B.

A user, represented by an eye E, views a composite view where virtual content is displayed in a display arrangement 110 by a display device 111 onto a semi-transparent display device 114 whereby the displayed virtual content is displayed as overlapping a view of real-life objects RLOs, as has been discussed in relation to FIGS. 2 and 3.

To enable for an automatic calibration according to a user's eye (or rather the position of the user's eye), the inventors have realized that by simply flipping or rotating the reflective device 114 around a rotational axis RA so that the image capturing device 112 is able to capture an image of the user's eye E, the exact position of the user's eye can be determined and the image capturing device 112 may be moved accordingly in order to calibrate the viewing device 100. In FIGS. 2 and 5A, the image capturing device is shown as being part of the display arrangement. Even though the image capturing device 112 may be located at a different location than the display device 111 and the reflective device 114, it is to be seen as considered comprised in the display arrangement 110 for the purpose of this application. It should also be noted that even though the moving arrangement 113 is shown as being arranged to move the image capturing device 112, it may also or alternatively be arranged to move—in addition to or as an alternative to moving the image capturing device—another part of the display arrangement, such as the display device 111 and/or the reflective device 114. There may thus be more than one moving arrangement 113 even if only one is shown.

A manner of calibrating the viewing device will now be discussed in detail with simultaneous reference to FIGS. 5A, 5B, 5C, 5D, 6, 7 and 8.

Figures 6, 7:
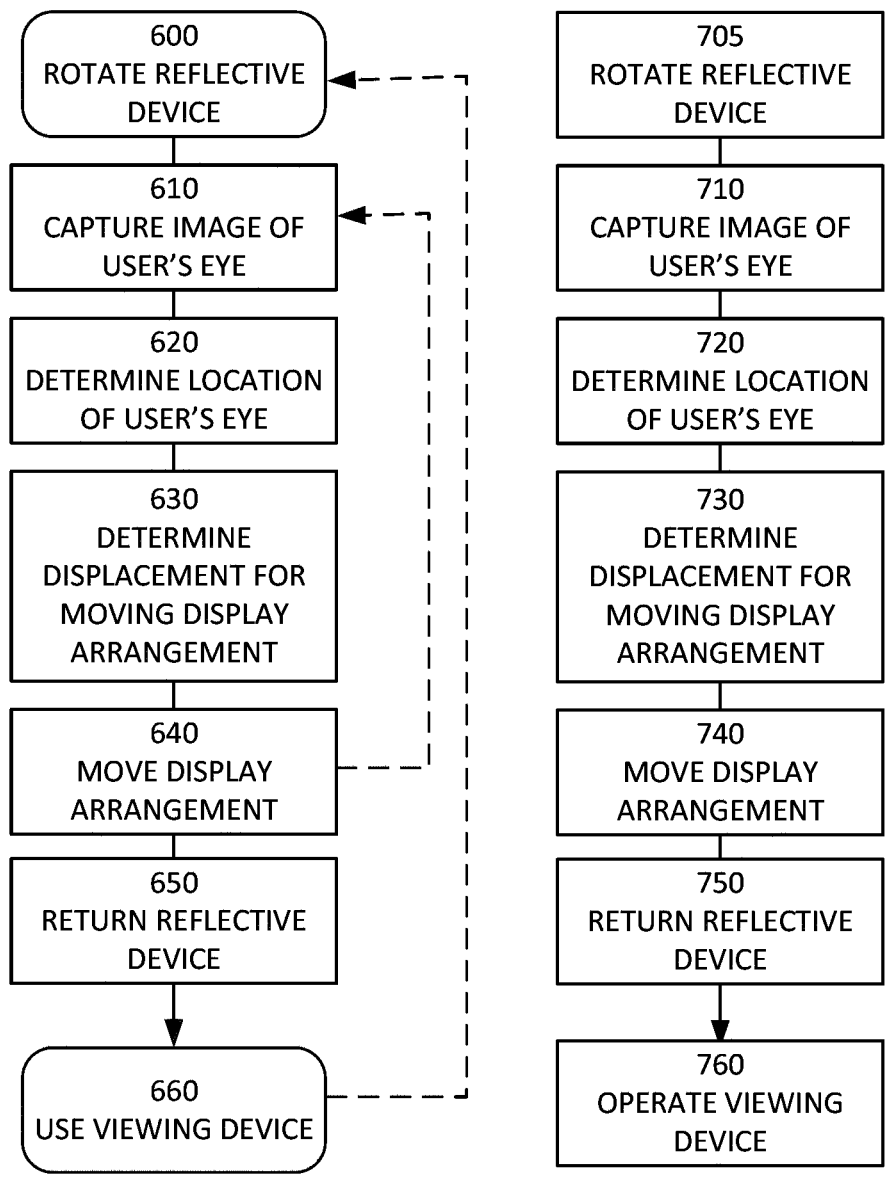
FIG. 6 shows a flowchart of a general method according to an embodiment of the present invention.
FIG. 7 shows a component view for a software component arrangement 700 according to an embodiment of the teachings herein.

FIG. 6 shows a flowchart of a general method according to an embodiment of the teachings herein. The method utilizes a viewing device 100 as taught herein for providing an automated calibration of the viewing device 100.

Before the calibration starts, or as a first measure taken in the calibration, the reflective device 114 is rotated 600 to enable the image capturing device 112 to capture an image of the user's eye E, whereby the image capturing device captures 610 an image of the user's eye E and the controller 101 of the viewing device 100 determines 620 a location of the user's eye E based on the image. The location may be an absolute location or a location relative to a reference point. In one embodiment the reference may be provided as virtual content by the display device 111. As can be seen in FIG. 5B, the content displayed by the display device 111 may also be captured by the image capturing device 112 and be used as a reference during the calibration.

In one embodiment, the determination of the user's eye E is preceded by a determination of that there is a user's eye present for the image capturing device to capture an image of. In one embodiment, this may be performed by the controller performing image analysis on a captured image.

As the location of the eye is determined, the controller 101 determines if and how a part of the display arrangement 110 should be moved. A determination to not move a part may be seen as a determination to move the part by zero displacement, thus no movement.

FIG. 5B shows how the reflective device 114 has been rotated to enable an image to be captured of the user's eye E in the viewing device 100 of FIG. 5A. In the example of FIG. 5B, the reflective device 114 has been rotated 90 degrees around a rotation axis that is in line with a center line of the reflective device 114. In another embodiment, the rotation axis is in line with an edge of the reflective device 114. As can be seen, a part of the display arrangement 110—in this example the image capturing device 112—is not in line with or otherwise aligned with the user's eye E.

The controller 101 is thus regarded to be configured to determine the displacement 630 for moving the part of the display arrangement based on the location of the user's eye E. The corresponding part is subsequently moved 640 by the displacement utilizing the moving arrangement 113. In one embodiment the image capturing device 112 is moved. As indicated above, even if the teachings herein focusses on moving the image capturing device, another part of the display arrangement may alternatively or additionally be moved. In one embodiment the display device 111 is moved. In one embodiment, more than one part is moved. In one embodiment the display arrangement 110 is moved.

Figure 5C:
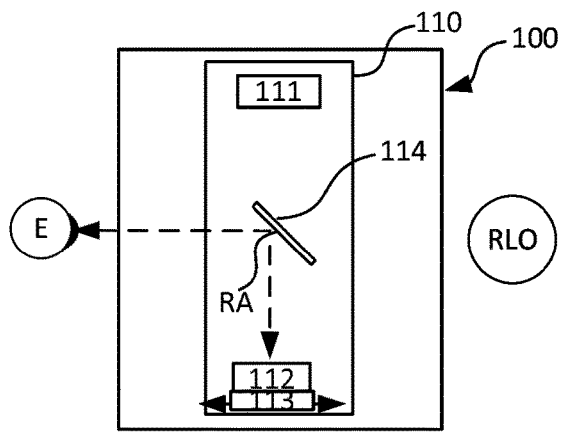
Figure 5B:
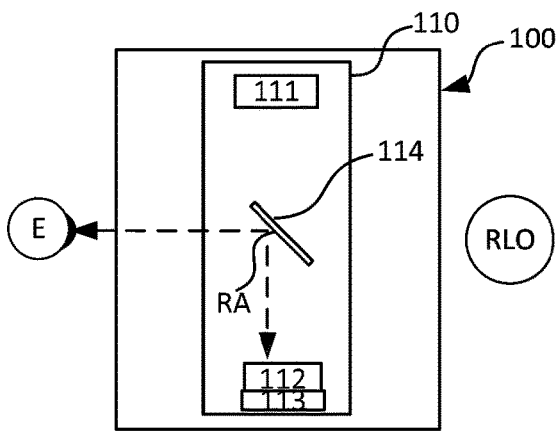

FIG. 5C shows how the reflective device 114 has been rotated to enable an image to be captured of the user's eye E in the viewing device 100 of FIGS. 5A and 5B. As can be seen, a part of the display arrangement 110—in this example the image capturing device 112—is has been moved (as indicated by the double headed arrow) utilizing the moving arrangement 113.

As indicated by the dashed line in FIG. 6, in one embodiment, a new image may be captured 610 of the user's eye E whereby a new location is determined 620 and a new displacement (if any) is determined 630 and the display arrangement is moved 640. The same part may be moved repeatedly, or alternatively or additionally another part may be moved.

As can be seen in FIG. 5C, the display arrangement 110 is now aligned with the user's eye E—in this example by the image capturing device 112 having been moved—and no further movement is needed.

When no further calibration is needed, the reflective device 114 is returned by being rotated back 650 to its original position and the viewing device 100 may be used 660 as intended.

Figure 5D:
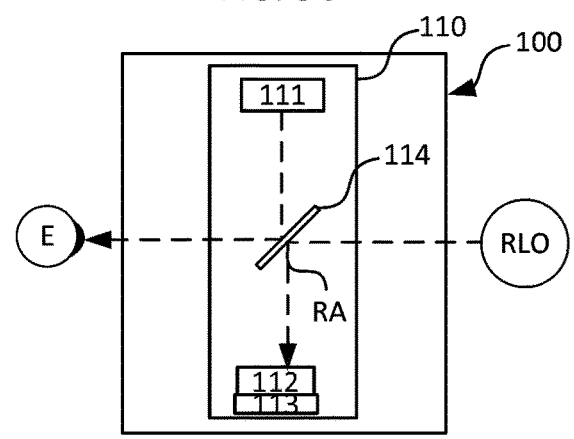

FIG. 5D shows how the reflective device 114 has been rotated to enable an image to be captured of the user's eye E in the viewing device 100 of FIGS. 5A, 5B and 5C.

As indicated above, other parts may be moved in addition to or instead of moving the image capturing device 112, all being considered to be aligning the display arrangement by moving at least a part of it.

In one embodiment and as he inventors have realized, if the rotation axis RA does not substantially coincide with the user's line of sight, the image capturing device 112 (or other part of the display arrangement 110) cannot simply be moved so that it's center of field of view coincides with the user's field of view (as reflected) as when the reflective device is returned, the center of field of view of the image capturing device 112 will no longer coincide with the user's field of view (as reflected). The controller is therefore configured to determine the displacement for the part to be moved based on the location of the user's eye in relation to the rotational axis RA of the reflective device 114, accommodating for any differences in lines of sight of the image capturing device (or other part of the display arrangement 110) and the user's eye E as the reflective device 114 is returned.

As has been indicated above with reference to FIG. 2, the moving arrangement 113 may be arranged to move the image capturing device 112 (or other part of the display arrangement 110) in 2 directions, in 3 directions and/or in an angular or rotated direction. As also indicated above with reference to FIG. 2, the movement may be physical or virtual.

Figure 5E:
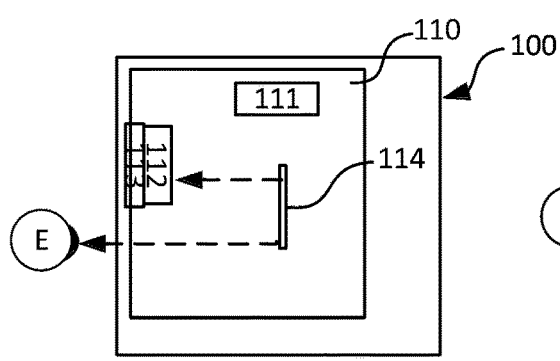

As also indicated above with reference to FIGS. 4A and 4B, the image capturing device 112 may be located in a different position, than (optically) opposite the display device 111. FIG. 5E shows the corresponding situation to the situation in FIG. 5B for a viewing device 100 as in FIG. 4A. In this example embodiment the reflective device 114 has been rotated to face both the user's eye E and the image capturing device 112 by being arranged in a vertical alignment.

Figure 5F:
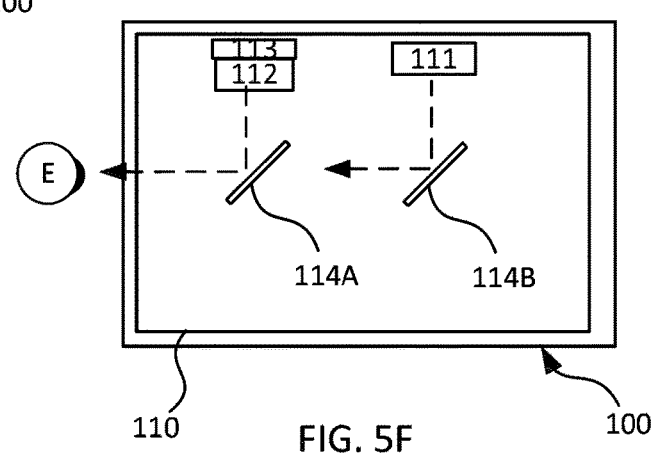

FIG. 5F shows the corresponding situation to the situation in FIG. 5B for a viewing device 100 as in FIG. 4B. In this example embodiment the reflective device 114A has been rotated 90 degrees to enable the image capturing device 112 to capture the user's eye E. As can be seen in FIG. 5F, the reflective device 114B of the display device 111 may also be used during the calibration, for example by providing illumination of the user's eye E or by providing virtual content for the user to focus on ensuring that the user's eye E is in a position where it will be during use of the viewing device 100.

As will be discussed below the calibration may be initiated in one or several different manners.

In one embodiment, the calibration is initiated upon startup of the viewing device 100. In such an embodiment the rotation of the reflective device 610 may be performed as the viewing device 100 is turned off (or otherwise de-activated). The viewing device 100 is thus prepared for calibration as soon as it is started up or otherwise rendered active. This is indicated in FIG. 6 by the dashed line from step 660 to step 600.

In one embodiment, the calibration is initiated by the controller 101 determining that the viewing device 100 is being worn by a user. In one embodiment, the controller 101 is configured to perform such determination based on input from the activity sensor 106. In such an embodiment the rotation of the reflective device 610 may be performed as the controller 101 determines that the viewing device 100 is taken off (or otherwise removed). The viewing device 100 is thus prepared for calibration as soon as it is worn again. This also ensures that the viewing device 100 is re-calibrated if it is switched to a new user during use. This is indicated in FIG. 6 by the dashed line from step 660 to step 600.

In one embodiment, the calibration is initiated by the controller 101 receiving an instruction to perform the calibration. This is indicated in FIG. 6 by the dashed line from step 660 to step 600.

In one such alternative or additional embodiment, the controller 101 receives the instruction to calibrate as an internal command from an application being executed by the controller 101.

In one such alternative or additional embodiment, the controller 101 receives the instruction to calibrate as a command from an application being executed and in contact with the controller 101 through the communication interface 103.

In one such alternative or additional embodiment, the controller 101 receives the instruction to calibrate through the user interface 104.

As the calibration is simple and only based on very simple image recognition for determining the location of an eye, it will be performed before a user has time to adapt his eyes to using the viewing device. The calibration will thus not even be noticed by the user, other than possibly a delay of a few tenths of a second before the view is complete as the reflective device is returned.

The manner of calibration is also not prone to error and does not require any substantial computational resources.

In all shown embodiments, the real life objects are still visible to the user during calibration and the incoming light is in most situations sufficient to illuminate the user's eye E for the image capturing device 112 to be able to successfully capture an image of the user's eye E. However, in some embodiments the viewing device is arranged with an illuminating device 107 for further illuminating the user's eye E. In one embodiment the illuminating device is the display device 111, such as in one embodiment of FIG. 5F. In other embodiments the illuminating device may be a Light Emitting Diode (LED).

As an alternative to rotating the reflective device 114, a plurality of reflective devices may be used where the transparency of the reflective devices 114 is changed to enable the image capturing device to capture an image of the user's eye. The reflective device is thus not necessarily rotated, but may simply be adapted to enable the image capturing device to capture an image of the user's eye.

FIG. 7 shows a component view for a software component arrangement 700 according to an embodiment of the teachings herein. The software component arrangement 700 is adapted to be used in a viewing device 100 as taught herein for providing an automated calibration of the viewing device 100.

The software component arrangement 700 of FIG. 7 comprises software components for calibrating the viewing device 100 or rather the display arrangement 110 to a user's eye E, including a software component for adapting 705 the reflective device 114 to enable the image capturing device to capture an image of a user's eye E and a software component for capturing 710 an image of a user's eye E. The software component arrangement 700 also comprises a software component for determining 720 a location of the user's eye E and a software component for determining 730 a displacement for adapting the display arrangement 110. The software component arrangement 700 also comprises a software component for adapting 740 at least a part of the display arrangement 110, 112, 111 and a software component for returning 750 the reflective device 114. The software component arrangement 700 also comprises a software component 860 for operating the viewing device 100.

Figure 8:
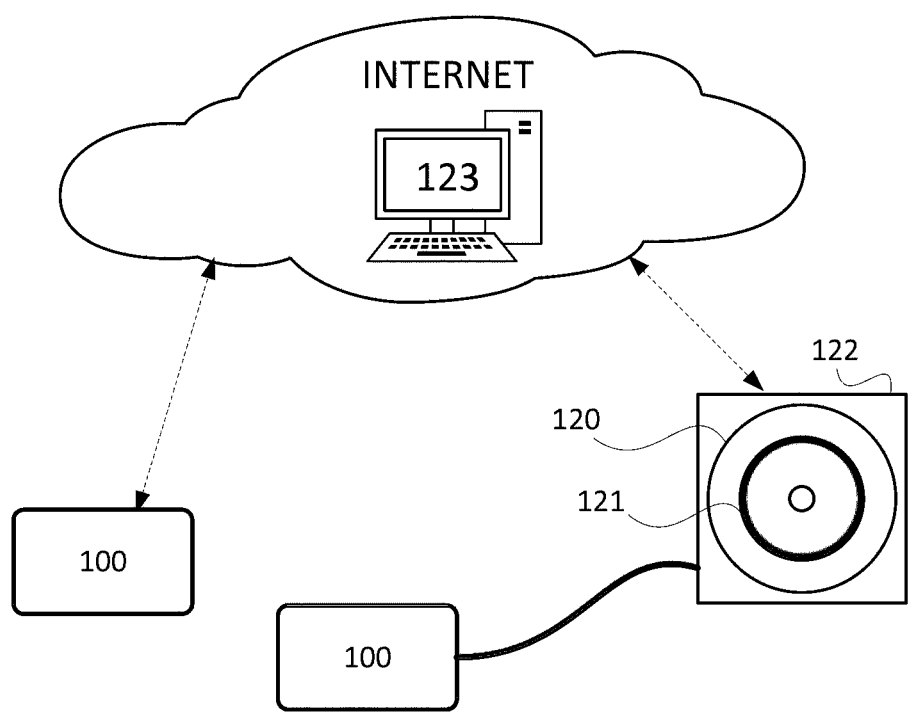
FIG. 8 shows a schematic view of a computer-readable medium carrying computer instructions that when loaded into and executed by a controller of a viewing device enables the viewing device to implement an embodiment of the present invention.

FIG. 8 shows a schematic view of a computer-readable medium 120 carrying computer instructions 121 that when loaded into and executed by a controller of a viewing device 100 enables the viewing device 100 to implement the present invention.

The computer-readable medium 120 may be tangible such as a hard drive or a flash memory, for example a USB memory stick or a cloud server. Alternatively, the computer-readable medium 120 may be intangible such as a signal carrying the computer instructions enabling the computer instructions to be downloaded through a network connection, such as an internet connection.

In the example of FIG. 8, a computer-readable medium 120 is shown as being a computer disc 120 carrying computer-readable computer instructions 121, being inserted in a computer disc reader 122. The computer disc reader 122 may be part of a cloud server 123—or other server—or the computer disc reader may be connected to a cloud server 123—or other server. The cloud server 123 may be part of the internet or at least connected to the internet.

The computer disc reader 122 may also or alternatively be connected to (or possibly inserted into) a viewing device 100 for transferring the computer-readable computer instructions 121 to a controller of the viewing device (presumably via a memory of the viewing device 100).

FIG. 8 shows both the situation when a viewing device 100 receives the computer-readable computer instructions 121 via an internet connection and the situation when another viewing device 100 receives the computer-readable computer instructions 121 through a wired interface. This enables for computer-readable computer instructions 121 being downloaded into a viewing device 100 thereby enabling the viewing device 100 to operate according to and implement the invention as disclosed herein.

It should be noted that if the viewing device 100 is to be used for an automated or controlled device, i.e. not a human user, the image perceiving device of the automated or controlled device is regarded to be the eye E and the automated or controlled device is regarded to be the user.

The invention claimed is:

1. An optical see-through viewing device comprising a controller configured to control a display arrangement comprising an image capturing device and a reflective device, wherein the controller is further configured to calibrate the optical see-through viewing device by:
   a) adapting the reflective device to enable the image capturing device to capture an image of a user's eye;
   b) capturing an image of a user's eye;
   c) determining a location of the user's eye;
   d) determining a displacement for adapting the display arrangement;
   e) adapting at least a part of the display arrangement; and
   f) returning the reflective device.

2. The optical see-through viewing device of claim 1, wherein the controller is further configured to a) adapt and f) return the reflective device by rotating it.

3. The optical see-through viewing device of claim 2, wherein the controller is further configured to rotate the reflective device around a rotation axis that is in line with a center line of the reflective device.

4. The optical see-through viewing device of claim 2, wherein the controller is further configured to rotate the reflective device 90 degrees.

5. The optical see-through viewing device of claim 1, wherein the controller is further configured to e) adapting the display arrangement by moving a part of it.

6. The optical see-through viewing device of claim 5, wherein the controller is further configured to e) adapting the display arrangement by moving the image capturing device.

7. The optical see-through viewing device of claim 1, wherein the controller is further configured to determinate that there is an eye present before capturing an image of the user's eye.

8. The optical see-through viewing device of claim 1, wherein the controller is further configured to initiate the calibration when the optical see-through viewing device is activated.

9. The optical see-through viewing device of claim 8, wherein the controller is further configured to a) adapt the reflective device when the optical see-through viewing device is de-activated.

10. The optical see-through viewing device of claim 1, wherein the controller is further configured to determine that the optical see-through viewing device is being worn and in response thereto initiate the calibration.

11. The optical see-through viewing device of claim 10, wherein the controller is further configured to determine that the optical see-through viewing device is no longer being worn and in response thereto adapt the reflective device.

12. The optical see-through viewing device of claim 10, further comprising an activity sensor, wherein the controller is further configured to determine whether the optical see-through viewing device is being worn based on sensor input received from the activity sensor.

13. The optical see-through viewing device of claim 12, wherein the activity sensor is a pressure sensor.

14. The optical see-through viewing device of claim 13, further comprising at least one nose pad, wherein the pressure sensor is arranged in the at least one nose pad.

15. The optical see-through viewing device of claim 12, wherein the activity sensor comprises at least one of any of: a capacitive sensor, a motion sensor, and a light sensor.

16. The optical see-through viewing device of claim 1, wherein the controller is further configured to adapt the at least a part of the display arrangement by moving the at least a part of the display arrangement in at least one of two directions.

17. The optical see-through viewing device of claim 1, wherein the controller is further configured to adapt the at least a part of the display arrangement by moving the at least a part of the display arrangement in at least one of three directions.

18. The optical see-through viewing device of claim 1, wherein the controller is further configured to adapt the at least a part of the display arrangement by moving the at least a part of the display arrangement in an angular direction.

19. A method for calibrating an optical see-through viewing device comprising a display arrangement comprising an image capturing device and a reflective device, wherein the method comprises calibrating the optical see-through viewing device by:
  a) adapting the reflective device to enable the image capturing device to capture an image of a user's eye;
  b) capturing an image of a user's eye;
  c) determining a location of the user's eye;
  d) determining a displacement for adapting the display arrangement;
  e) adapting at least a part of the display arrangement; and
  f) returning the reflective device.

20. A non-transitory computer-readable medium comprising, stored thereupon, a software component arrangement for calibrating an optical see-through viewing device comprising a controller configured to control a display arrangement comprising an image capturing device and a reflective device, wherein the software component arrangement comprises:
  a) a software component for adapting the reflective device to enable the image capturing device to capture an image of a user's eye;
  b) a software component for capturing an image of a user's eye;
  c) a software component for determining a location of the user's eye;
  d) a software component for determining a displacement for adapting the display arrangement;
  e) a software component for adapting at least a part of the display arrangement; and
  f) a software component for returning the reflective device.

* * * * *